US012054969B2

(12) United States Patent
Mohrmann et al.

(10) Patent No.: US 12,054,969 B2
(45) Date of Patent: Aug. 6, 2024

(54) MECHANICAL INTRUSION INDICATION (71) Applicant: HEWLETT PACKARD ENTERPRISE DEVELOPMENT LP, Houston, TX (US)

(72) Inventors: Vaden Albert Mohrmann, Cedar Park, TX (US); Teresa Angela Gillon, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 550 days.

(21) Appl. No.: 17/445,627

(22) Filed: Aug. 23, 2021

(65) Prior Publication Data
US 2023/0055409 A1 Feb. 23, 2023

(51) Int. Cl.
H05K 5/02 (2006.01)
E05B 41/00 (2006.01)
G08B 13/02 (2006.01)
H05K 7/14 (2006.01)

(52) U.S. Cl.
CPC ............ E05B 41/00 (2013.01); G08B 13/02 (2013.01); H05K 7/1489 (2013.01)

(58) Field of Classification Search
CPC ........ H05K 7/1489; G08B 13/02; E05B 41/00
See application file for complete search history.

(56) References Cited

U.S. PATENT DOCUMENTS

| 5,818,689 | A  | * | 10/1998 | Johns ...................... G06F 1/16 74/567 |
| 6,700,476 | B1 | * | 3/2004  | Okada ................ G07C 9/00309 340/12.51 |
| 6,968,414 | B2 | * | 11/2005 | Abbondanzio ....... G06F 13/409 710/301 |
| 9,818,273 | B2 | * | 11/2017 | Nekoogar .............. G08B 13/06 |
| 11,514,196 | B2 | * | 11/2022 | Grobelny .............. H04L 9/0891 |
| 2009/0128955 | A1 | * | 5/2009 | Moses .................. G11B 23/037 360/132 |
| 2009/0293136 | A1 | * | 11/2009 | Campbell .............. G08B 13/19 726/34 |
| 2013/0170107 | A1 | * | 7/2013 | Dean ...................... A45C 11/00 361/679.01 |
| 2017/0227312 | A1 | * | 8/2017 | Christensen .............. F41A 9/66 |
| 2021/0047105 | A1 | * | 2/2021 | Bhat ..................... A47J 31/407 |
| 2021/0073426 | A1 | * | 3/2021 | Eriksson ................. G06F 21/86 |
| 2021/0330904 | A1 | * | 10/2021 | Franzmann ....... A61M 15/0071 |
| 2022/0117627 | A1 | * | 4/2022 | Garai ................. A61B 17/3468 |
| 2022/0327249 | A1 | * | 10/2022 | Kulkarni ................. G06F 21/86 |

* cited by examiner

Primary Examiner — Thomas D Alunkal
(74) Attorney, Agent, or Firm — Trop, Pruner & Hu, P.C.

(57) ABSTRACT

In some examples, an electronic device for mounting in a chassis includes a housing to be received in the chassis, and a mechanical intrusion indication segment to move from a retracted position to an extended position responsive to mounting of the housing in the electronic device. The mechanical intrusion indication segment when in the extended position is to break upon removal of the housing from the chassis. A controller is to detect an intrusion of the electronic device in response to breaking of the mechanical intrusion indication segment.

20 Claims, 6 Drawing Sheets

MECHANICAL INTRUSION INDICATION

BACKGROUND

Electronic devices can be placed into a chassis. For example, the chassis can be in the form of a rack with bays to receive corresponding electronic devices. Examples of electronic devices include servers, such as blade servers or other types of servers. In other examples, electronic devices can include storage devices, communication nodes, and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A data center or other computing environment (e.g., a cloud environment, a storage area network, etc.) can include a large number of chassis, with each chassis including multiple electronic devices. As used here, a "chassis" can refer to a physical structure that is capable of receiving an electronic device or multiple electronic devices. An example of a chassis can include a rack that has multiple bays for receiving corresponding electronic devices. Other examples of chassis can be employed in other arrangements.

Examples of electronic devices can include any or some combination of the following: server computers (e.g., blade servers or other types of servers), storage devices, communication nodes, and so forth.

In some cases, unauthorized personnel may attempt to physically access an electronic device that is mounted in a chassis. For example, an unauthorized person may remove an electronic device from a chassis and tamper with the electronic device. Tampering with the electronic device can involve any or some combination of the following: accessing (using a program or hardware component) the electronic device to read data stored in the electronic device, writing data to the electronic device to corrupt information stored in the electronic device, physically installing hardware or machine-readable instructions (e.g., in the form of software or firmware) into the electronic device to perform unauthorized actions, removing a component from the electronic device, or otherwise performing an unauthorized action with respect to the electronic device.

Any physical interaction by an intruder (e.g., an unauthorized person or machine) with an electronic device mounted in a chassis can be referred to as an "intrusion" of the electronic device.

In some examples, techniques or mechanisms are not provided to allow for detection of intrusion of electronic devices mounted in a chassis. Thus, an operator of a computing environment may not be aware that physical intrusion has occurred with respect to any given electronic device in the computing environment, which can pose a security risk.

In accordance with some implementations of the present disclosure, techniques or mechanisms are provided for intrusion indication based on use of a mechanical indication segment that can be included as part of an electronic device. The mechanical intrusion detection indication segment can be physically moved between a retracted position and an extended position. The mechanical intrusion indication segment is in the retracted position when the electronic device is initially inserted into a chassis. Once the electronic device is mounted in the chassis and powered, the mechanical intrusion indication segment is activated to move from the retracted position to the extended position. In the extended position, the mechanical intrusion indication segment can engage a corresponding feature of the chassis (e.g., an opening in the chassis or some other feature of the chassis). If the electronic device were to be removed from the chassis, the mechanical intrusion indication segment would engage the feature and break. The breaking of the mechanical intrusion indication segment provides an indication of intrusion the electronic device in the chassis.

Figure 1A:
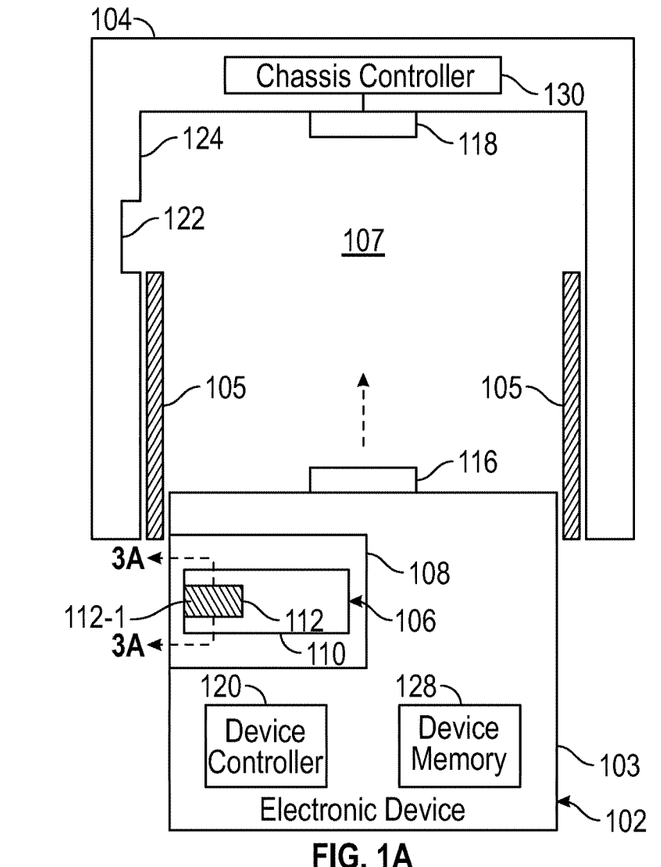
FIGS. 1A-1C are block diagrams of an arrangement that includes an electronic device mounted in a chassis and removed from the chassis, respectively, in accordance with some examples.
Figure 1B:
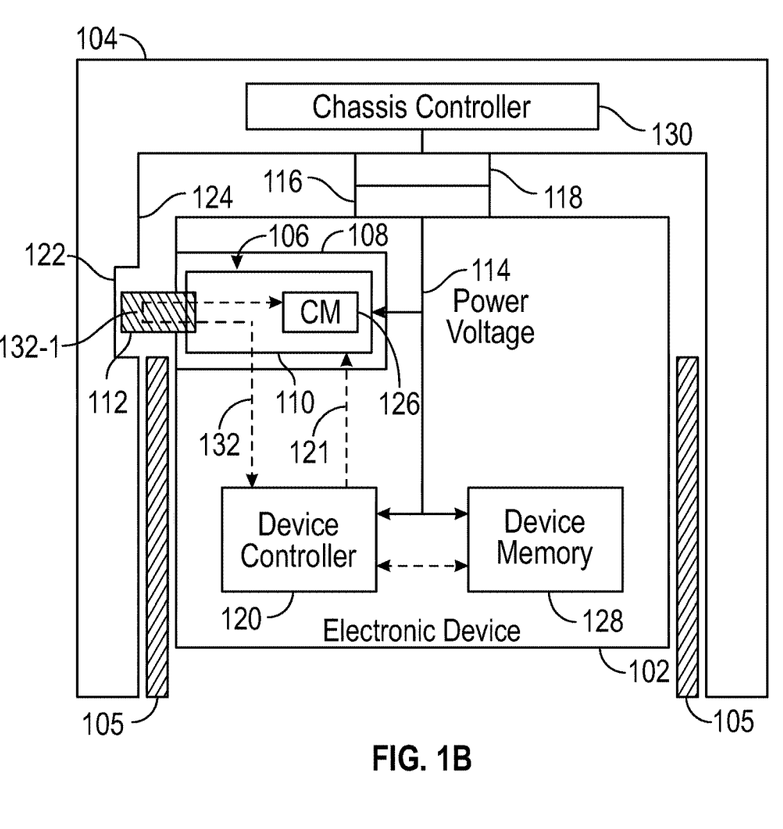
Figure 1C:
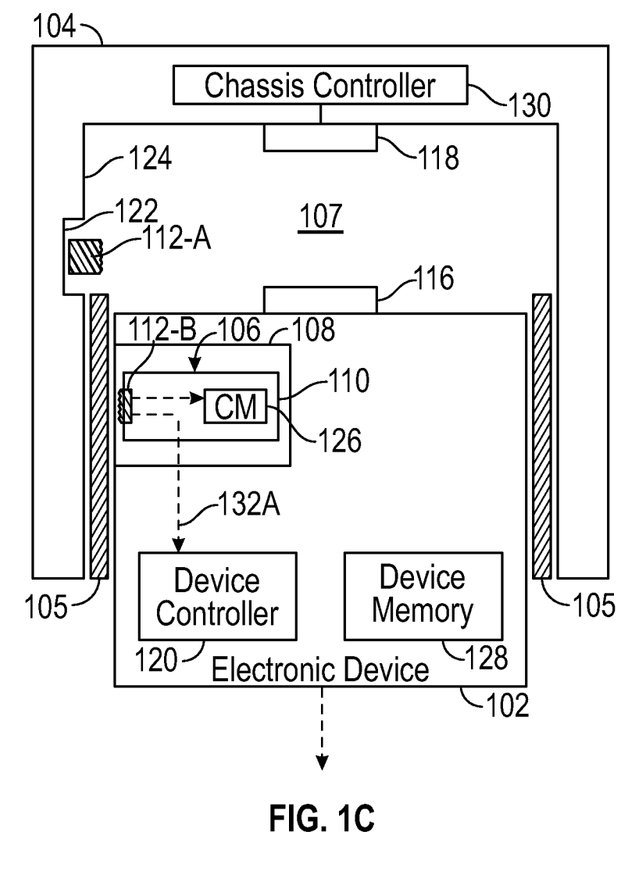

FIGS. 1A-1C show three different positions of an electronic device 102 relative to a chassis 104 in which the electronic device 102 can be removably mounted. FIG. 1A shows a position of the electronic device 102 prior to installation of the electronic device 102 in the chassis 104. FIG. 1B shows the electronic device 102 mounted in the chassis 104, and FIG. 1C shows the electronic device 102 removed from the chassis 104 after being mounted in the chassis 104.

In accordance with some implementations of the present disclosure, an intrusion cartridge 106 is installed in the electronic device 102. In some examples, the intrusion cartridge 106 is removably installed in a receptacle 108 of the electronic device 102. This allows for the intrusion cartridge 106 to be removed and replaced with another intrusion cartridge, when appropriate (examples discussed further below).

The intrusion cartridge 106 has an outer cartridge housing 110 in which an intrusion segment 112 is initially contained. The intrusion segment 112 has a retracted position (as shown in FIG. 1A) and an extended position (as shown in FIG. 1B). The intrusion segment 112 includes a block of a frangible material, such as a plastic, glass, or any other material that can be broken when a force above a certain threshold is applied on the intrusion segment 112.

In the retracted position, the intrusion segment 112 is retracted (partially or entirely) into the outer cartridge housing 110 as well as into an outer device housing 103 of the electronic device 102, so that a distal end 112-1 of the intrusion segment 112 does not contact a mounting rail 105 of the chassis 104 as the electronic device 102 is mounted into a bay (or other space) 107 of the chassis 104. In some examples, the electronic device 102 has mounting structures (e.g., wheels, sliders, etc.) that can engage with mounting rails 105 of the chassis 104 to allow the electronic device 102 to be moved (e.g., slid) into the bay 107. In other examples, instead of mounting rails, the chassis 104 can include mounting slots or other mounting structures to receive the electronic device 102 into the bay 107.

The intrusion segment 112 can be moved from the retracted position (FIG. 1A) to the extended position (FIG. 1B) in response to an input stimulus. In some examples, the input stimulus is in the form of a power voltage 114 supplied to the intrusion cartridge 106 when the electronic device 102 is mounted in the chassis 104. For example, the electronic device 102 has a device electrical connector 116 to mate with a corresponding chassis electrical connector 118 of the chassis 104. The electrical connectors 116 and 118 include electrical power contacts to allow for power to be supplied to the electronic device 102 once the device electrical connector 116 is mated to the chassis electrical connector 118. In some examples, the chassis 104 can have a power supply or can be connected to an external power supply, such as a wall outlet.

The electrical connectors 116 and 118 further include signal contacts to allow for communication of signals between the electronic device 102 and the chassis 104.

When the electronic device 102 is mounted in the chassis 104 and the electrical connectors 116 and 118 are mated, the power voltage 114 is energized. The intrusion cartridge includes an activation mechanism (discussed further below) that when energized by the power voltage 114 causes actuation of the intrusion segment 112 from the retracted position to the extended position.

In other examples, the input stimulus to actuate the intrusion segment 112 can be in the form of an activation signal 121 from a device controller 120 of the electronic device 102. For example, the device controller 120 can activate the activation signal 121 (from an inactive state to an active state) to cause actuation of the intrusion segment 112 from the retracted position to the extended position. The device controller 120 can activate the activation signal 121 in response to the device controller 120 being powered up, or otherwise being instructed, such as by firmware or other machine-readable instructions in the electronic device 102. The active state of the activation signal 121 can be a high or low state, and the inactive state of the activation signal 121 can be the other one of the high or low state.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In some examples, the device controller 120 can perform various management tasks of the electronic device 102. The device controller 120 can be separate from a main processor (or main processors) (not shown) of the electronic device 102, which is (are) used to execute firmware, an operating system (OS), an application program, and other machine-readable instructions of the electronic device 102.

When the intrusion segment 112 moves from the retracted position to the extended position, the intrusion segment 112 engages a feature of the chassis 104. In some examples, the feature to which the intrusion segment 112 is engaged includes an opening 122 of the chassis 104. The opening 122 is defined in a wall 124 of the chassis. In other examples, the intrusion segment 112 when in the extended position can engage another type of feature of the chassis 104, such as a protrusion, or any other type of feature.

In some examples, once the intrusion segment 112 is moved to its extended position, the intrusion segment 112 is not allowed to be retracted. Disabling the retraction of the intrusion segment 112 can be performed mechanically or electrically (discussed further below).

Once the electronic device 102 is installed in the chassis 104 and the device controller 120 has started (e.g., has started its boot procedure or completed its boot procedure to load the OS of the electronic device 102), the device controller 120 checks for an indication of an intrusion of the electronic device 102.

In examples according to FIGS. 1A-1C, the device controller 120 checks for the indication of an intrusion of the electronic device 102 by attempting to access data stored in the intrusion cartridge 106. More specifically, the device controller 120 can attempt to access data stored in a cartridge memory (CM) 126 in the intrusion cartridge 106. The cartridge memory 126 can be implemented using a collection of non-volatile memory devices (a "collection" can refer to one or multiple).

The cartridge memory 126 can be used to store specified information that is to be read by the device controller 120 to determine whether or not an intrusion has occurred with respect to the electronic device 102. In some examples, device controller 120 can access the cartridge memory 126 over a communication path 132. The communication path can allow for the communication of data signals and/or control signals (e.g., address signals, memory control signals, etc.).

The communication path 132 has a portion 132-1 that extends through the intrusion segment 112. As long as the intrusion segment 112 is intact (i.e., a portion of the intrusion segment 112 has not been broken off), the communication path 132 between the device controller 120 and the cartridge memory 126 in the intrusion cartridge 106 remains intact and the device controller 120 is able to successfully read data stored in the cartridge memory 126 using the communication path 132.

In some examples, the specified information that is read from the cartridge memory 126 includes a serial number or other identification information associated with the intrusion cartridge 106. In other examples, the cartridge memory 126 can store other information to be read by the device controller 120.

In some examples, in response to successfully reading the specified information from the cartridge memory 126, the device controller 120 is able to make a determination that no intrusion has occurred with respect to the electronic device 102. In some examples, in response to determining that no intrusion has occurred with respect to the electronic device 102, the device controller 120 can write certain information to a device memory 128 that is part of the electronic device 102. The device memory 128 can be implemented with a collection of volatile memory devices and/or non-volatile memory devices.

The information that can be written by the device controller 120 to the device memory 128 can include a unique value that represents the electronic device 102 (e.g., an identification such as a serial number of the electronic device 102), a timestamp representing a time at which the information was written to the device memory 128, and other information. The information written by the controller 120 to the device memory 128 can be stored in a log that is in the device memory 128. In other examples, other information can be written by the controller 120 to the device memory 128 in response to determining that no intrusion has occurred with respect to the electronic device 102. For example, the other information can include an indicator (e.g., a flag set to a specified value) that no intrusion has occurred with respect to the electronic device 102.

In further examples, the information written by the controller 120 to the device memory 128 can further or alternatively include the specified information (e.g., the serial number of the intrusion cartridge 106) read from the cartridge memory 126. This serial number written to the device memory 128 can be used in subsequent boot cycles of the electronic device 102 to compare with newly read serial numbers to determine if there is a difference, which can indicate possible tampering.

After determining that no intrusion has occurred with respect to the electronic device 102, the device controller 120 can allow normal operations to continue in the electronic device 102. For example, the device controller 120 can allow a boot procedure to proceed to load the OS of the electronic device 102.

As shown in FIG. 1C, an intruder has removed the electronic device 102 from the chassis 104. As a result of this removal, the intrusion segment 112 is broken into multiple intrusion segment pieces 112-A and 112-B due to interaction of the intrusion segment 112 with the opening 122 (or other feature, such as the rail 105) of the chassis 104.

As a result of the intrusion segment piece 112-A being broken off, the communication path 132 is also broken, which disables access by the controller 120 of the cartridge memory 126. The broken communication path 132 is represented as 132A in FIG. 1C.

If the electronic device 102 were to be re-mounted into the bay 107 of the chassis 104 after being removed (FIG. 1C) and after the intrusion segment 112 has been broken, then any attempt by the device controller 120 to read the cartridge memory 126 would fail because of the broken communication path 132A. The inability to read the cartridge memory 126 provides an indication to the device controller 120 that intrusion has occurred with respect to the electronic device 102. As a result, the device controller 120 can take action(s) (discussed further below) in response to the determination by the device controller 120 that intrusion has occurred with respect to the electronic device 102.

As further shown in FIGS. 1A-1C, the chassis 104 includes a chassis controller 130 that can perform management actions with respect to the chassis 104, and with respect to electronic devices mounted in the chassis 104.

The above examples assume that an intruder removed the electronic device 102 from the chassis 104 in FIG. 1C. In other examples, authorized personnel (e.g., a service technician) may remove the electronic device 102 from the chassis 104 to perform servicing, such as regular maintenance or to repair a faulty component. As part of the service operation, the authorized personnel replaces the intrusion cartridge 106 with the broken intrusion segment 112 with another intrusion cartridge with an intact intrusion segment, and then mounts the electronic device 102 back into the chassis 104 or another chassis.

In further examples, an intrusion indication signal 220 can be output from the intrusion cartridge 106. The intrusion indication signal 220 can have a first state (to indicate that the intrusion segment 112 is intact and thus no intrusion has occurred) and a second state (indicating that the intrusion segment 112 is broken and thus intrusion has occurred).

Figure 2:
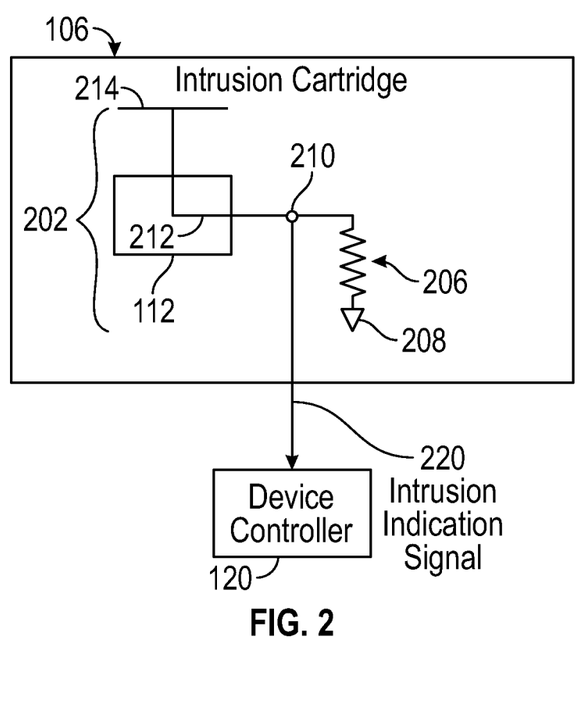
FIG. 2 is a block diagram of an arrangement including an intrusion cartridge that has an intrusion indication circuit, in accordance with some examples.

In further examples, other techniques or mechanisms can be used to indicate intrusion with the electronic device 102. FIG. 2 shows another example that includes an intrusion indication circuit 202 that provides an intrusion indication in the form of an intrusion indication signal 204. The intrusion indication signal 204 is provided as an input to a specified input pin of the device controller 120, such as a general-purpose input/output (GPIO) pin or another type of input pin.

The intrusion indication circuit 202 can include a pulldown circuit that has a pulldown resistor 206 with a first end connected to a ground reference 208, and a second end connected to a node 210. The node 210 provides the intrusion indication signal 204.

The node 210 is connected over an electrically conductive line 212 to a high voltage 214, such as the power voltage 114 of FIG. 1B. If the intrusion segment 112 is intact, the node 210 is pulled high to the high voltage 214 (e.g., 1.8 volts, 3.3 volts, 5 volts, etc.), and the intrusion indication signal 220 has a high state. On the other hand, if the intrusion segment 112 is broken, then the node 210 is pulled to the ground reference 208 through the pulldown resistor 206, and the intrusion indication signal 220 has a low state.

The controller 120 determines whether or not intrusion has occurred based on whether the intrusion indication signal 220 has the low state (intrusion has occurred) or the high state (intrusion has not occurred).

In other examples, the intrusion indication circuit 202 can have a different arrangement. For example, instead of using a pulldown circuit as shown in FIG. 2, a pullup circuit can be used. The pullup circuit sets the intrusion indication signal 220 to a low state if the intrusion segment 112 is intact, and sets the intrusion indication signal 220 to a high state if the intrusion segment 112 is broken.

In further examples, the device controller 120 can use other techniques or mechanisms to detect an intrusion of the electronic device 102. The device controller 120 can use a combination of different techniques or mechanisms, such as by relying on determining a state of the intrusion indication signal 220 as well as determining whether a read of data in the cartridge memory 126 is successful.

Figure 3A:
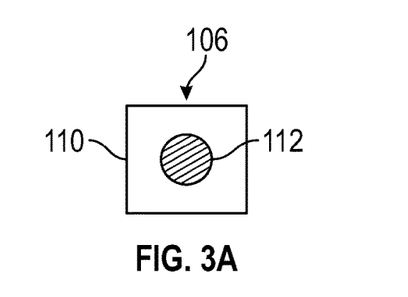
FIGS. 3A-3C are views of an intrusion cartridge, according to some examples.
Figure 3B:
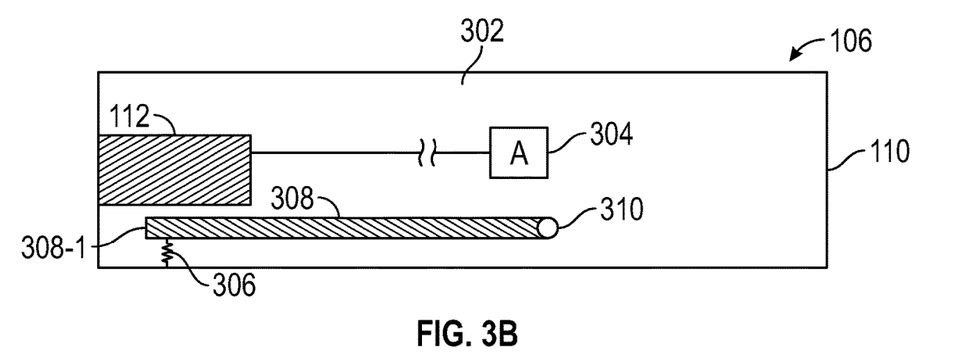
Figure 3C:
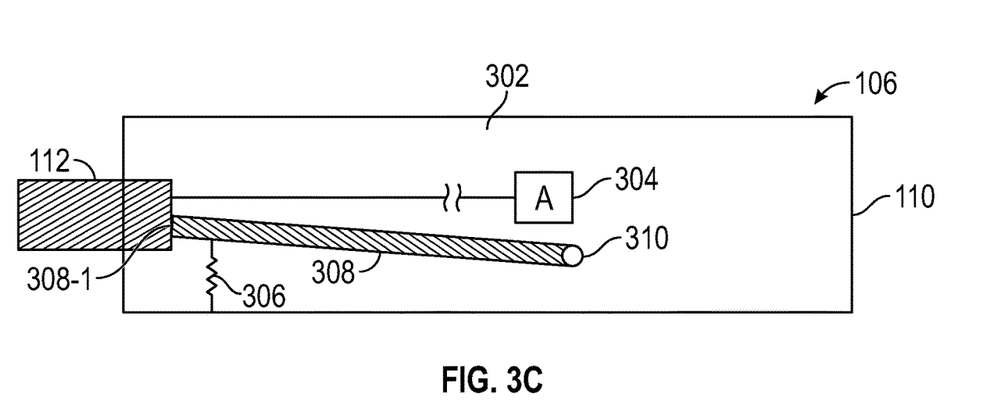

FIGS. 3A-3C illustrate various views of the intrusion cartridge 106.

FIG. 3A is a cross-sectional view of the intrusion cartridge 106 taken along section line 3A-3B in FIG. 1A. In examples according to FIG. 3A, the intrusion segment 112 has a generally circular cross-sectional profile. In such an example, the intrusion segment 112 is generally cylindrical in shape. In other examples, the intrusion segment 112 can have a differently shaped cross-sectional profile.

FIG. 3B shows the intrusion segment 112 in its retracted position inside an inner chamber 302 defined by the outer cartridge housing 110. FIG. 3C shows the intrusion segment 112 in its extended position, with a portion of the intrusion segment 112 extending outside the outer cartridge housing 110.

The intrusion segment 112 is operatively coupled to an actuation mechanism 304. When the actuation mechanism 304 is activated (such as due to power being applied to the intrusion cartridge 106 and the actuation mechanism 304) once the electronic device 102 is mounted in the chassis 104 and the electrical connectors 116 and 118 are mated (FIG. 1B), the actuation mechanism 304 causes movement of the intrusion segment 112 from the retracted position of FIG. 3B to the extended position of FIG. 3C.

In further examples, the actuation mechanism 304 is responsive to an activation signal (e.g., the activation signal 121 of FIG. 1B) to actuate the intrusion segment 112 from the retracted position to the extended position.

In some examples, the actuation mechanism 304 can include an electromagnet that produces a magnetic field when an electrical current is supplied to the actuation mechanism 304. The magnetic field can interact with a magnetic portion of the intrusion segment 112 to cause displacement of the intrusion segment 112. In other examples, the actuation mechanism 304 can include a small motor to move the intrusion segment 112 when the motor is activated.

Once the intrusion segment 112 has moved to its extended position, a biasing element 306 can push a mechanical stop 308 (which can be in the form of a bar or a plate, for example) upwardly from a lowered position (FIG. 3B) of the mechanical stop 308 to a raised position (FIG. 3C). In the raised position, an end 308-1 of the mechanical stop 308 abuts against a rear portion of the intrusion segment 112 to prevent the intrusion segment 112 from being pushed backwardly from the extended position to the retracted position.

A rear end of the mechanical stop 308 is attached to a pivot 310 such that the mechanical stop 308 is pivotally mounted with respect to the intrusion cartridge 106. In some examples, the biasing element 306 includes a spring, which is in its compressed state in FIG. 3B. When the actuation mechanism 304 moves the intrusion segment away from the mechanical stop 308, as shown in FIG. 3C, the spring un-compresses to pivot the mechanical stop 308 upwardly to abut against the rear portion of the intrusion segment 112.

In other examples, a different arrangement of the mechanical stop 308 can be used.

In further examples, instead of using the mechanical stop 308, the actuation mechanism 304 can be designed such that the actuation mechanism 304 can actuate the intrusion segment 112 from the retracted position to the extended position, but not vice versa.

Figure 4:
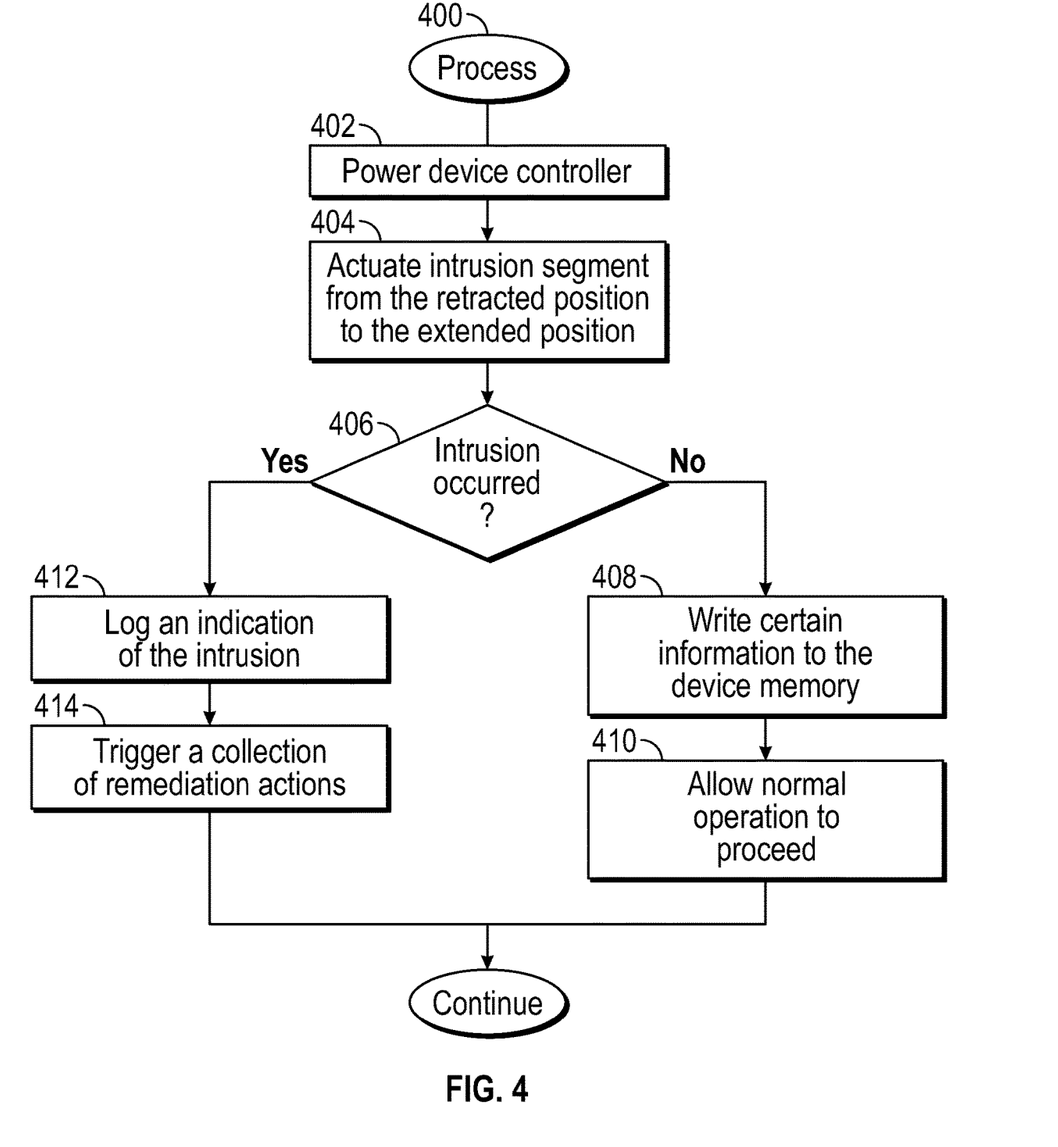
FIG. 4 is a flow diagram of a process according to some examples.

FIG. 4 is a flow diagram of a process 400 according to some examples. Upon insertion of the electronic device 102 into the chassis 104 and matting of the electrical connectors 116 and 118 (FIG. 1B), the electronic device 102 is powered up, which causes the device controller 120 to be powered (at 402). The powering of the electronic device 102 causes power to also be supplied to the intrusion cartridge 106, which causes the intrusion segment 112 to be actuated (at 404) from the retracted position to the extended position.

The device controller 120 determines (at 406) whether an intrusion has occurred with respect to the electronic device 102. In some examples, the intrusion determination is based on an attempt by the device controller 120 in reading specified information (e.g., a serial number) from the cartridge memory 126. Alternatively, the intrusion determination is based on the device controller 120 detecting a state of the intrusion indication signal 220.

If the device controller 120 determines (at 406) that intrusion has not occurred, the device controller 120 can write (at 408) certain information (as discussed above) to the device memory 128 of the electronic device 102, and the device controller 120 allows (at 410) a normal operation of the electronic device 102 to proceed, such as by allowing the electronic device 102 to boot its OS.

However, if the device controller 120 determines (at 406) that intrusion has occurred, the device controller 120 can log (at 412) an indication of the intrusion. The indication of the intrusion can be in the form of an intrusion indicator (e.g., a flag set to a specified value) written to the device memory 128. Further, the device controller 120 can trigger (at 414) a collection of remediation actions to perform, where the collection includes a single remediation action or multiple remediation actions. The collection of remediation actions can include any or some combination of the following: send an alert of the intrusion to the chassis controller 130 (FIGS. 1A-1C) or another entity; disable the electronic device 102 (such as by powering down the electronic device 102, or preventing completion of the booting of the electronic device 102, or another disabling action); or powering up the electronic device 102 in a restricted mode in which some functions are allowed while other functions are disabled (e.g., network access is disabled); and so forth.

Figure 5:
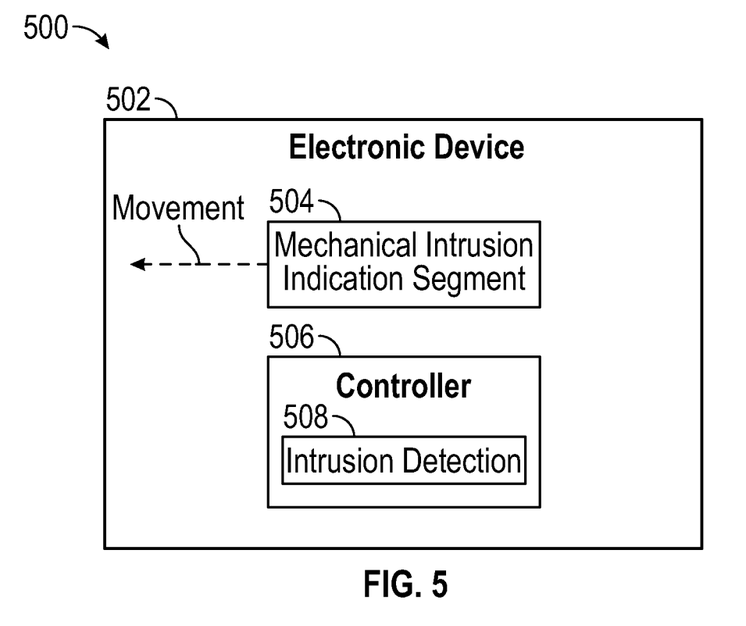
FIG. 5 is a block diagram of an electronic device, in accordance with some examples.

FIG. 5 is a block diagram of an electronic device 500 according to some examples. An example of the electronic device 500 is the electronic device 102 of FIGS. 1A-1C.

The electronic device 500 is for mounting in a chassis (e.g., 104 in FIGS. 1A-1C). The electronic device 500 includes a housing 502 to be received in the chassis.

The electronic device 500 includes a mechanical intrusion indication segment 504 (e.g., the intrusion segment 112 of FIGS. 1A-1C and 3A-3C) to move from a retracted position to an extended position responsive to mounting of the housing in the electronic device. The mechanical intrusion indication segment 504 can move from the retracted position to the extended position when power is applied to the electronic device 500 once the electronic device 500 is mounted in the chassis.

The mechanical intrusion indication segment 504 when in the extended position is to break upon removal of the housing 502 from the chassis, such as due to physical interaction of the mechanical intrusion indication segment 504 with a feature (e.g., the opening 122 and/or the rail 105 and/or another feature) of the chassis.

The electronic device 500 includes a controller 506 (e.g., the device controller 120 of FIGS. 1A-1C) to detect an intrusion (508) of the electronic device 500 in response to breaking of the mechanical intrusion indication segment 504.

In some examples, the controller 506 is to detect the intrusion based on determining that the controller 506 is unable to read data stored in a cartridge that includes the mechanical intrusion indication segment 504. Reading specified information from a cartridge memory (e.g., 126 in FIG. 1B) of the cartridge allows the controller 506 to confirm that the mechanical intrusion indication segment 504 of the cartridge is intact, to allow for the controller 506 to take a remediation action in case of intrusion to prevent unauthorized access of the electronic device 500.

In further examples, the controller 506 is to detect the intrusion based on a state of a signal (e.g., the intrusion indication signal 220 of FIG. 2) that depends on whether the mechanical intrusion indication segment 504 is intact or broken. The use of the signal allows the controller 506 to more reliably and easily detect intrusion of the electronic device 500.

In some the mechanical intrusion indication segment 504 when in the extended position is to extend into an opening of the chassis. By extending the mechanical intrusion indication segment 504 into the opening of the chassis, the mechanical intrusion indication segment 504 is to break due to interaction of the mechanical intrusion indication segment 504 with a wall of the chassis when the housing 502 is removed from the chassis.

In some examples, a stop (e.g., the mechanical stop 308 of FIGS. 3B and 3C) prevents retraction of the mechanical intrusion indication segment 504 from the extended position to the retracted position. This is to prevent an intruder from manually or electronically attempting to retract the mechanical intrusion indication segment 504 to avoid detection of intrusion.

In further examples, a cartridge includes the mechanical intrusion indication segment 504 and an actuation mechanism (e.g., 304 in FIGS. 3B-3C) to actuate the mechanical intrusion indication segment 504 from the retracted position to the extended position. The controller 506 when powered is to activate an activation signal to the actuation mechanism to cause the actuation of the mechanical intrusion indication segment 504. By ensuring that the mechanical intrusion indication segment 504 is actuated after the electronic device 500 is mounted into the chassis, a reliable mechanism is provided to detect intrusion.

Figure 6:
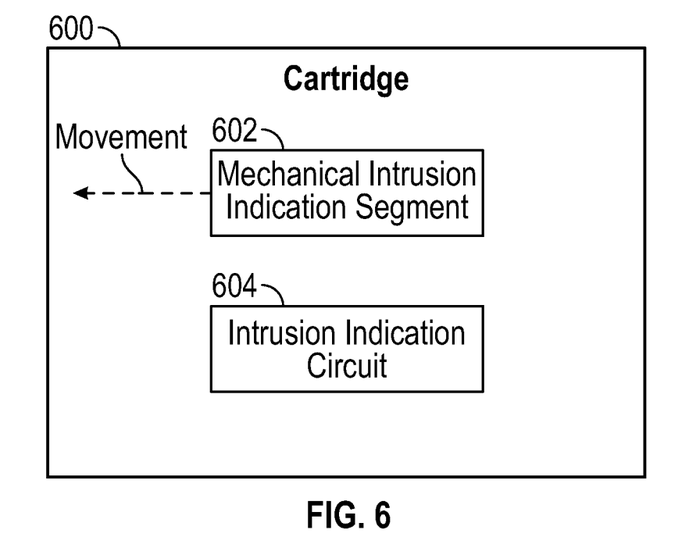
FIG. 6 is a block diagram of a cartridge according to some examples.

FIG. 6 is a block diagram of a cartridge 600 for inclusion in an electronic device. In some examples, the cartridge 600 is removably installed in the electronic device, to allow for the cartridge 600 to be replaced, such as by a service technician as part of a service operation after the service technician removes the electronic device and causes a mechanical intrusion indication segment 602 to break.

The mechanical intrusion indication segment 602 is electrically activatable to move between a retracted position and an extended position, where the mechanical intrusion indication segment 602 is breakable by engagement of the mechanical intrusion indication segment 602 with a feature of a chassis when the electronic device is removed from the chassis.

The cartridge 600 includes an intrusion indication circuit 604, where the intrusion indication circuit 604 provides an indication of intrusion with the electronic device if the mechanical intrusion indication segment 602 is broken.

In some examples, the cartridge 600 includes a cartridge memory, and in such examples, the intrusion indication circuit 604 includes a communication path between the cartridge memory and a controller of the electronic device, where a portion of the communication path extends through the mechanical intrusion indication segment 602. The indication of intrusion is based on the communication path being broken due to breaking of the mechanical intrusion indication segment 602.

In further examples, the intrusion indication circuit 604 is to set an intrusion indication signal to a first state in response to the mechanical intrusion indication segment 602 being intact, and to set the intrusion indication signal to a second state different from the first state in response to the mechanical intrusion indication segment 602 being broken, where the intrusion indication signal being set to the second state is the indication of intrusion.

Figure 7:
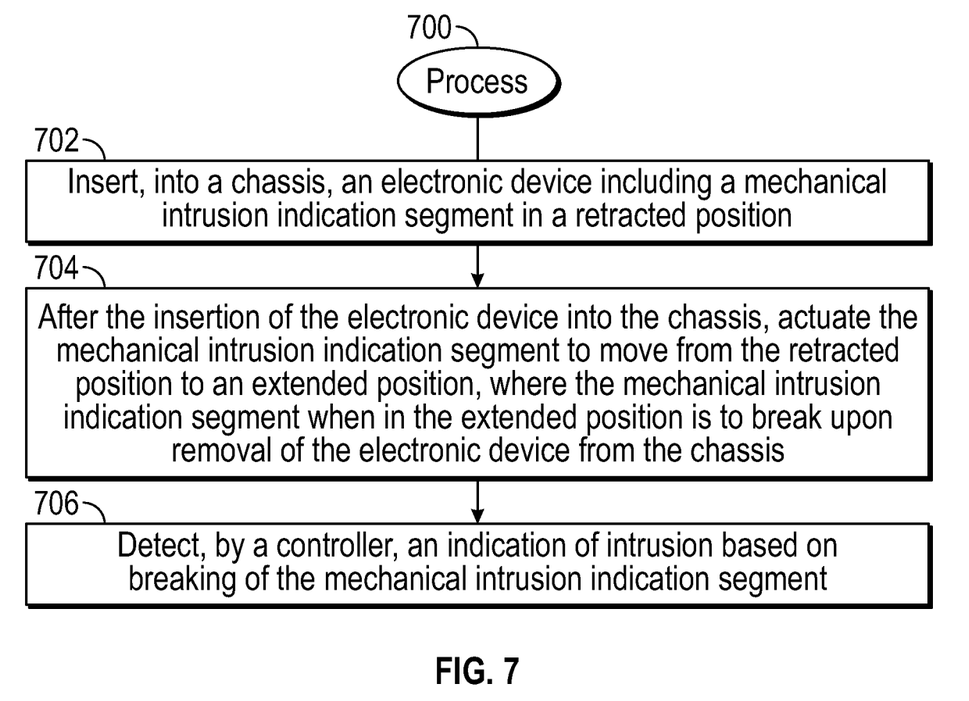
FIG. 7 is a flow diagram of a process according to further examples.

FIG. 7 is a flow diagram of a process 700 according to some examples. The process 700 includes inserting (at 702), into a chassis, an electronic device including a mechanical intrusion indication segment in a retracted position.

After the insertion of the electronic device into the chassis, the process 700 actuates (at 704) the mechanical intrusion indication segment to move from the retracted position to an extended position, where the mechanical intrusion indication segment when in the extended position is to break upon removal of the electronic device from the chassis.

The process 700 includes detecting (at 706), by a controller, an indication of intrusion based on breaking of the mechanical intrusion indication segment. The controller that performs the detection can be the device controller 120 or the chassis controller 130 in FIGS. 1A-1C. In cases where the controller is the chassis controller 130, the chassis controller 130 detects the indication of intrusion based on an alert sent by the device controller 120 to the chassis controller 130, as noted further above.

In some examples, the mechanical intrusion indication segment is part of a cartridge that further includes a memory, where the memory is inaccessible responsive to the mechanical intrusion indication segment being broken, and where the detecting of the indication of intrusion is based on an inability by a requester (e.g., the device controller 120 or an entity outside the device controller 120) in reading the memory.

Tasks of a controller (e.g., the device controller 120 or the chassis controller 130 or another controller) can be performed by machine-readable instructions stored in a storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device for mounting in a chassis, comprising:
   a housing to be received in the chassis;
   a mechanical intrusion indication segment to move from
      a retracted position to an extended position responsive
      to mounting of the housing in the electronic device,
   wherein the mechanical intrusion indication segment
      when in the extended position is to break upon removal
      of the housing from the chassis; and
   a controller to detect an intrusion of the electronic device
      in response to breaking of the mechanical intrusion
      indication segment.

2. The electronic device of claim 1, wherein the controller is to detect the intrusion based on determining that the controller is unable to read data stored in a cartridge that includes the mechanical intrusion indication segment.

3. The electronic device of claim 1, wherein the controller is to detect the intrusion based on a state of a signal that depends on whether the mechanical intrusion indication segment is intact or broken.

4. The electronic device of claim 1, wherein the mechanical intrusion indication segment when in the extended position is to extend into an opening of the chassis.

5. The electronic device of claim 1, wherein the mechanical intrusion indication segment is to break due to interaction of the mechanical intrusion indication segment with a wall of the chassis when the housing is being removed from the chassis.

6. The electronic device of claim 1, further comprising:
a stop to prevent retraction of the mechanical intrusion indication segment from the extended position to the retracted position.

7. The electronic device of claim 1, further comprising a cartridge including:
the mechanical intrusion indication segment, and
an actuation mechanism to actuate the mechanical intrusion indication segment from the retracted position to the extended position.

8. The electronic device of claim 7, wherein the controller when powered is to activate an activation signal to the actuation mechanism.

9. The electronic device of claim 1, comprising:
a cartridge including a memory and the mechanical intrusion indication segment.

10. The electronic device of claim 9, wherein information stored in the memory is accessible by the controller responsive to the mechanical intrusion indication segment being intact.

11. The electronic device of claim 10, wherein the information stored in the memory is inaccessible by the controller responsive to the mechanical intrusion indication segment being broken.

12. The electronic device of claim 11, wherein the controller is to communicate with the memory using a communication path between the controller and the memory, wherein a portion of the communication path extends through the mechanical intrusion indication segment, and the communication path is broken if the mechanical intrusion indication segment is broken.

13. The electronic device of claim 1, wherein the controller is to:
in response to detecting the intrusion, perform a remediation action.

14. The electronic device of claim 13, wherein the remediation action of the controller includes sending an alert or disabling the electronic device or powering up the electronic device in a restricted mode.

15. A cartridge for inclusion in an electronic device, comprising:
a mechanical intrusion indication segment electrically activatable to move between a retracted position and an extended position, wherein the mechanical intrusion indication segment is breakable by engagement of the mechanical intrusion indication segment with a feature of a chassis when the electronic device is removed from the chassis; and
an intrusion indication circuit, the intrusion indication circuit to provide an indication of intrusion with the electronic device if the mechanical intrusion indication segment is broken.

16. The cartridge of claim 15, comprising:
a memory,
wherein the intrusion indication circuit comprises a communication path between the memory and a controller of the electronic device, wherein a portion of the communication path extends through the mechanical intrusion indication segment, and the indication of intrusion is based on the communication path being broken due to breaking of the mechanical intrusion indication segment.

17. The cartridge of claim 15, wherein the intrusion indication circuit is to:
set an intrusion indication signal to a first state in response to the mechanical intrusion indication segment being intact, and
set the intrusion indication signal to a second state different from the first state in response to the mechanical intrusion indication segment being broken, wherein the intrusion indication signal being set to the second state is the indication of intrusion.

18. The cartridge of claim 15, comprising:
an actuation mechanism to cause actuation of the mechanical intrusion indication segment from the retracted position to the extended position; and
a mechanical stop to prevent retraction of the mechanical intrusion indication segment from the extended position to the retracted position.

19. A method comprising:
inserting, into a chassis, an electronic device comprising a mechanical intrusion indication segment in a retracted position;
after the insertion of the electronic device into the chassis, actuating the mechanical intrusion indication segment to move from the retracted position to an extended position, wherein the mechanical intrusion indication segment when in the extended position is to break upon removal of the electronic device from the chassis; and
detecting, by a controller, an indication of intrusion based on breaking of the mechanical intrusion indication segment.

20. The method of claim 19, wherein the mechanical intrusion indication segment is part of a cartridge that further includes a memory, wherein the memory is inaccessible responsive to the mechanical intrusion indication segment being broken, and wherein the detecting of the indication of intrusion is based on an inability by a requester in reading the memory.

\* \* \* \* \*